(12) United States Patent
Cao et al.

(10) Patent No.: US 9,894,276 B2
(45) Date of Patent: Feb. 13, 2018

(54) SYSTEM AND METHOD FOR SUPPORTING THREE-DIMENSIONAL DISPLAY IN FIRST PERSON VIEW (FPV)

(71) Applicant: SZ DJI TECHNOLOGY CO., LTD., Shenzhen (CN)

(72) Inventors: Zisheng Cao, Shenzhen (CN); Linchao Bao, Shenzhen (CN); Pan Hu, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/349,678

(22) Filed: Nov. 11, 2016

(65) Prior Publication Data

US 2017/0070722 A1    Mar. 9, 2017

Related U.S. Application Data

(63) Continuation of application No. PCT/CN2015/089133, filed on Sep. 8, 2015.

(51) Int. Cl.
| | |
|---|---|
| *H04N 13/00* | (2006.01) |
| *H04N 7/18* | (2006.01) |
| *H04N 5/232* | (2006.01) |
| *H04N 13/02* | (2006.01) |

(52) U.S. Cl.
CPC ..... *H04N 5/23248* (2013.01); *H04N 13/0221* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2011/0025825 A1 | 2/2011 | McNamer et al. | |
| 2011/0025829 A1* | 2/2011 | McNamer | H04N 13/021 348/50 |
| 2011/0050857 A1* | 3/2011 | Lee | H04N 13/0011 348/47 |

(Continued)

FOREIGN PATENT DOCUMENTS

| | | |
|---|---|---|
| CN | 104504748 | 4/2015 |
| WO | WO-2013/062557 | 5/2013 |

OTHER PUBLICATIONS

International Search Report dated May 27, 2016, in counterpart International Application No. PCT/CN2015/089133; 4 pages.

(Continued)

*Primary Examiner* — Kevin McInnish
(74) *Attorney, Agent, or Firm* — Finnegan, Henderson, Farabow, Garrett & Dunner, L.L.P.

(57) ABSTRACT

System and method can support three-dimensional display. The system can receive a plurality of image frames, which are captured by an imaging device on a movable object. Furthermore, the system can obtain state information of the imaging device on the movable object, and use the state information to configure a pair of image frames based on the plurality of image frames for supporting a three-dimensional first person view (FPV). Additionally, an image frame selected from the plurality of image frames can be used for a first image frame in the pair of image frames.

28 Claims, 10 Drawing Sheets

(56) References Cited

U.S. PATENT DOCUMENTS

2011/0228047 A1* 9/2011 Markham .......... H04N 13/0221
348/43
2012/0147139 A1* 6/2012 Li .......................... G03B 35/08
348/43
2014/0363100 A1 12/2014 Usikov

OTHER PUBLICATIONS

Written Opinion dated May 27, 2016, in counterpart International Application No. PCT/CN2015/089133; 4 pages.

* cited by examiner

SYSTEM AND METHOD FOR SUPPORTING THREE-DIMENSIONAL DISPLAY IN FIRST PERSON VIEW (FPV)

CROSS-REFERENCE TO RELATED APPLICATIONS

This application is a continuation application of International Application No. PCT/CN2015/089133 filed on Sep. 8, 2015, the content of which is hereby incorporated by reference in its entirety.

BACKGROUND OF THE INVENTION

The disclosed embodiments relate generally to supporting digital display and more particularly, but not exclusively, to supporting three-dimensional display.

The ubiquitous displaying experience for various mobile platforms, such as the unmanned aerial vehicle (UAV) systems, has been limited to two-dimensional. This is because the display equipment for most mobile platforms (e.g. the external display screens, special display screens, notebook display screens, and tablets) are designed for panel display.

On the other hand, different stereoscopic display equipment may be needed for displaying depth information, which increases both the complexity and cost of the overall system. For example, the unmanned aerial vehicle (UAV) systems may need to deploy more sophisticated image capturing modules, encoding/decoding modules, and communication modules, in addition to various special 3D display equipment, in order to display stereoscopic information on a three-dimensional (3D) display.

Thus, there is a need for developing a simple and inexpensive three-dimensional (3D) display. This is the general area that embodiments of the invention are intended to address.

BRIEF SUMMARY OF THE INVENTION

Described herein are systems and methods that can support three-dimensional display. The system can receive a plurality of image frames, which are captured by an imaging device on a movable object. Furthermore, the system can obtain state information of the imaging device on the movable object, and use the state information to configure a pair of image frames based on the plurality of image frames for supporting a three-dimensional first person view (FPV). Additionally, an image frame selected from the plurality of image frames can be used for a first image frame in the pair of image frames.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses an unmanned aerial vehicle (UAV) as example for a movable object. It will be apparent to those skilled in the art that other types of movable object can be used without limitation.

Figure 1:
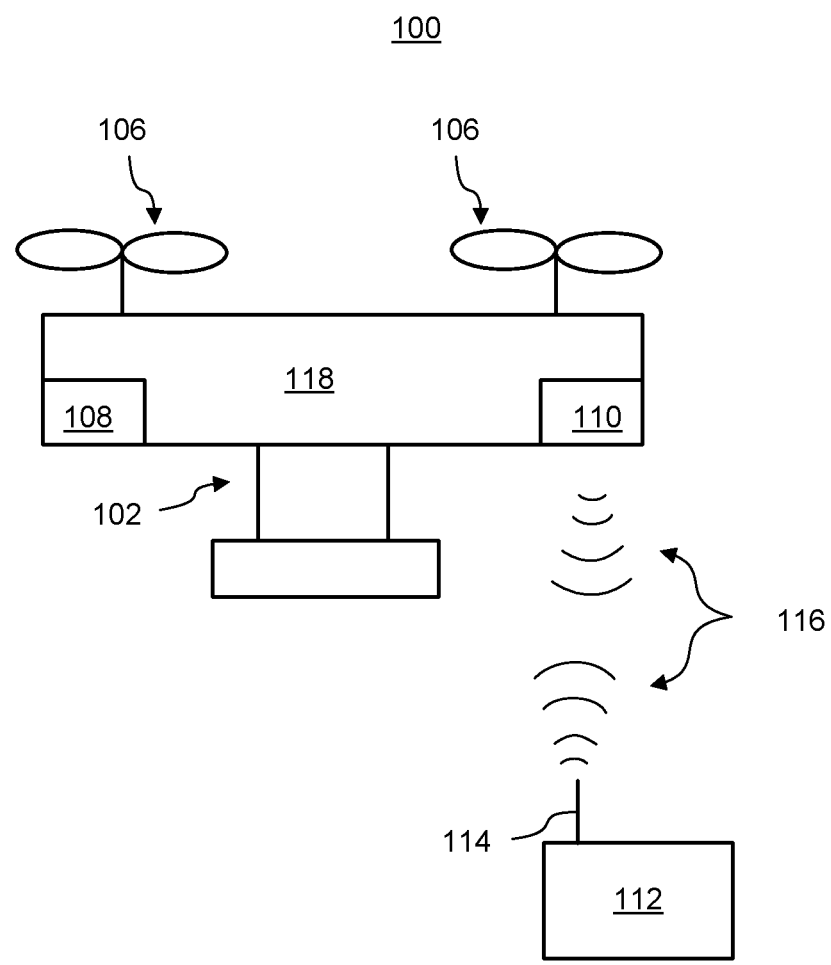
FIG. 1 illustrates a movable object environment, in accordance with various embodiments of the present invention.

FIG. 1 illustrates a movable object environment, in accordance with various embodiments of the present invention. As shown in FIG. 1, a movable object 118 in a movable object environment 100 can include a carrier 102 and a payload 104. Although the movable object 118 can be depicted as an aircraft, this depiction is not intended to be limiting, and any suitable type of movable object can be used. One of skill in the art would appreciate that any of the embodiments described herein in the context of aircraft systems can be applied to any suitable movable object (e.g., a UAV). In some instances, the payload 104 may be provided on the movable object 118 without requiring the carrier 102.

In accordance with various embodiments of the present invention, the movable object 118 may include one or more movement mechanisms 106 (e.g. propulsion mechanisms), a sensing system 108, and a communication system 110.

The movement mechanisms 106 can include one or more of rotors, propellers, blades, engines, motors, wheels, axles, magnets, nozzles, animals, or human beings. For example, the movable object may have one or more propulsion mechanisms. The movement mechanisms 106 may all be of the same type. Alternatively, the movement mechanisms 106 can be different types of movement mechanisms. The movement mechanisms 106 can be mounted on the movable object 118 (or vice-versa), using any suitable means such as a support element (e.g., a drive shaft). The movement mechanisms 106 can be mounted on any suitable portion of the movable object 118, such on the top, bottom, front, back, sides, or suitable combinations thereof.

In some embodiments, the movement mechanisms 106 can enable the movable object 118 to take off vertically from a surface or land vertically on a surface without requiring any horizontal movement of the movable object 118 (e.g., without traveling down a runway). Optionally, the movement mechanisms 106 can be operable to permit the movable object 118 to hover in the air at a specified position and/or orientation. One or more of the movement mechanisms 106 may be controlled independently of the other movement mechanisms. Alternatively, the movement mechanisms 106 can be configured to be controlled simultaneously. For example, the movable object 118 can have multiple horizontally oriented rotors that can provide lift and/or thrust to the movable object. The multiple horizontally oriented rotors can be actuated to provide vertical takeoff, vertical landing, and hovering capabilities to the movable object 118. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 118 (e.g., with respect to up to three degrees of translation and up to three degrees of rotation).

The sensing system 108 can include one or more sensors that may sense the spatial disposition, velocity, and/or acceleration of the movable object 118 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 108 can be used to control the spatial disposition, velocity, and/or orientation of the movable object 118 (e.g., using a suitable processing unit and/or control module). Alternatively, the sensing system 108 can be used to provide data regarding the environment surrounding the movable object, such as weather conditions, proximity to potential obstacles, location of geographical features, location of manmade structures, and the like.

The communication system 110 enables communication with terminal 112 having a communication system 114 via wireless signals 116. The communication systems 110, 114 may include any number of transmitters, receivers, and/or transceivers suitable for wireless communication. The communication may be one-way communication, such that data can be transmitted in only one direction. For example, one-way communication may involve only the movable object 118 transmitting data to the terminal 112, or vice-versa. The data may be transmitted from one or more transmitters of the communication system 110 to one or more receivers of the communication system 112, or vice-versa. Alternatively, the communication may be two-way communication, such that data can be transmitted in both directions between the movable object 118 and the terminal 112. The two-way communication can involve transmitting data from one or more transmitters of the communication system 110 to one or more receivers of the communication system 114, and vice-versa.

In some embodiments, the terminal 112 can provide control data to one or more of the movable object 118, carrier 102, and payload 104 and receive information from one or more of the movable object 118, carrier 102, and payload 104 (e.g., position and/or motion information of the movable object, carrier or payload; data sensed by the payload such as image data captured by a payload camera; and data generated from image data captured by the payload camera). In some instances, control data from the terminal may include instructions for relative positions, movements, actuations, or controls of the movable object, carrier, and/or payload. For example, the control data may result in a modification of the location and/or orientation of the movable object (e.g., via control of the movement mechanisms 106), or a movement of the payload with respect to the movable object (e.g., via control of the carrier 102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors (e.g., of the sensing system 108 or of the payload 104) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data transmitted by the terminal 112 can be configured to control a state of one or more of the movable object 118, carrier 102, or payload 104. Alternatively or in combination, the carrier 102 and payload 104 can also each include a communication module configured to communicate with terminal 112, such that the terminal can communicate with and control each of the movable object 118, carrier 102, and payload 104 independently.

In some embodiments, the movable object 118 can be configured to communicate with another remote device in addition to the terminal 112, or instead of the terminal 112. The terminal 112 may also be configured to communicate with another remote device as well as the movable object 118. For example, the movable object 118 and/or terminal 112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 118, receive data from the movable object 118, transmit data to the terminal 112, and/or receive data from the terminal 112. Optionally, the remote device can be connected to the Internet or other telecommunications network, such that data received from the movable object 118 and/or terminal 112 can be uploaded to a website or server.

Figure 2:
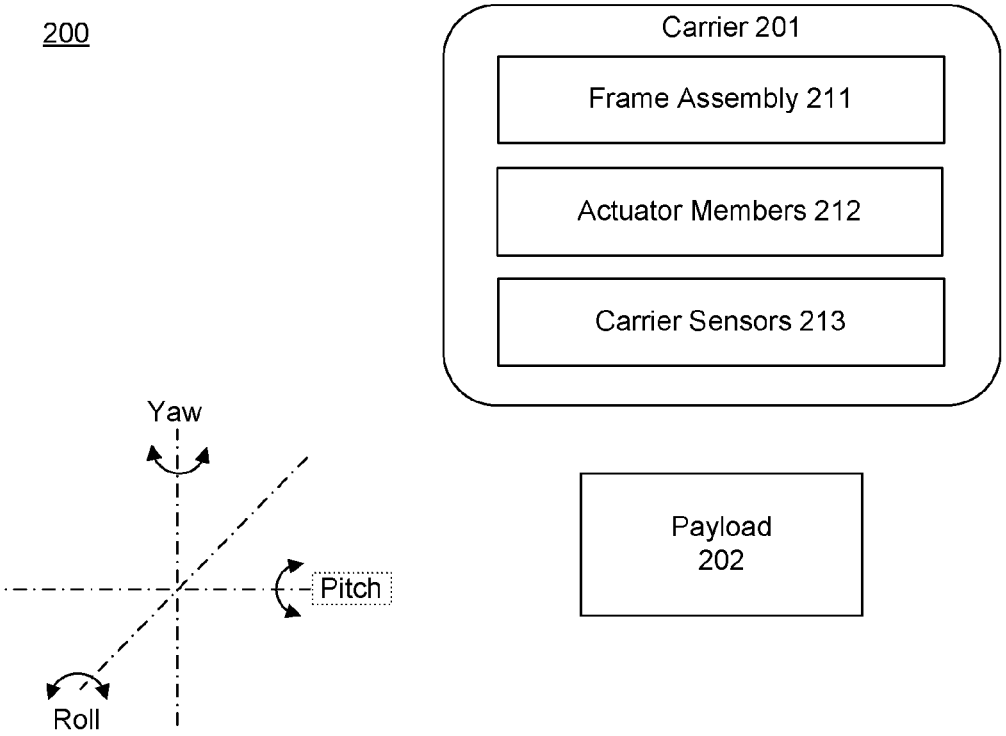
FIG. 2 illustrates an exemplary carrier in a movable object environment, in accordance with embodiments.

FIG. 2 illustrates an exemplary carrier in a movable object environment, in accordance with embodiments. The carrier 200 can be used to couple a payload 202 such as an image capturing device to a movable object such as a UAV.

The carrier 200 can be configured to permit the payload 202 to rotate about one or more axes, such as three axes: X or pitch axis, Z or roll axis, and Y or yaw axis, relative to the movable object. For instance, the carrier 200 may be configured to permit the payload 202 to rotate only around one, two, or three of the axes. The axes may or may not be orthogonal to each other. The range of rotation around any of the axes may or may not be limited and may vary for each of the axes. The axes of rotation may or may not intersect with one another. For example, the orthogonal axes may intersect with one another. They may or may not intersect at a payload 202. Alternatively, they may not intersect.

The carrier 200 can include a frame assembly 211 comprising one or more frame members. For example, a frame member can be configured to be coupled with and support the payload 202 (e.g., image capturing device).

In some embodiments, the carrier 201 can comprise one or more carrier sensors 213 useful for determining a state of the carrier 201 or the payload 202 carried by the carrier 201. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload 202. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors 213 may be coupled to any suitable portion or portions of the carrier (e.g., frame members and/or actuator members) and may or may not be movable relative to the UAV. Additionally or alternatively, at least some of the carrier sensors may be coupled directly to the payload 202 carried by the carrier 201.

The carrier sensors 213 may be coupled with some or all of the actuator members of the carrier. For example, three carrier sensors can be respectively coupled to the actuator members 212 for a three-axis carrier and configured to measure the driving of the respective actuator members 212 for the three-axis carrier. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member, a second potentiometer can be used to generate a second position signal for the second actuator member, and a third potentiometer can be used to generate a third position signal for the third actuator member. In some embodiments, carrier sensors 213 may also be coupled to some or all of the frame members of the carrier. The sensors may be able to convey information about the position and/or orientation of one or more frame members of the carrier and/or the image capturing device. The sensor data may be used to determine position and/or orientation of the image capturing device relative to the movable object and/or a reference frame.

The carrier sensors 213 can provide position and/or orientation data that may be transmitted to one or more controllers (not shown) on the carrier or movable object. The sensor data can be used in a feedback-based control scheme. The control scheme can be used to control the driving of one or more actuator members such as one or more motors. One or more controllers, which may be situated on a carrier or on a movable object carrying the carrier, can generate control signals for driving the actuator members. In some instances, the control signals can be generated based on data received from carrier sensors indicative of the spatial disposition of the carrier or the payload 202 carried by the carrier 201. The carrier sensors may be situated on the carrier or the payload 202, as previously described herein. The control signals produced by the controllers can be received by the different actuator drivers. Based on the control signals, the different actuator drivers may control the driving of the different actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier 201 can be coupled indirectly to the UAV via one or more damping elements. The damping elements can be configured to reduce or eliminate movement of the load (e.g., payload, carrier, or both) caused by the movement of the movable object (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable object that are transmitted to the load. For example, the motion may include vibrations caused by the operation of a propulsion system and/or other components of a UAV.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements may provide damping primarily along the Y (yaw) axis. As such, the illustrated damping elements can be configured to reduce vertical motions.

Although various embodiments may be depicted as utilizing a single type of damping elements (e.g., rubber balls), it shall be understood that any suitable combination of types of damping elements can be used. For example, the carrier may be coupled to the movable object using one or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable objects. In some instances, the load can be embedded within or enclosed by one or more damping elements.

Figure 3:
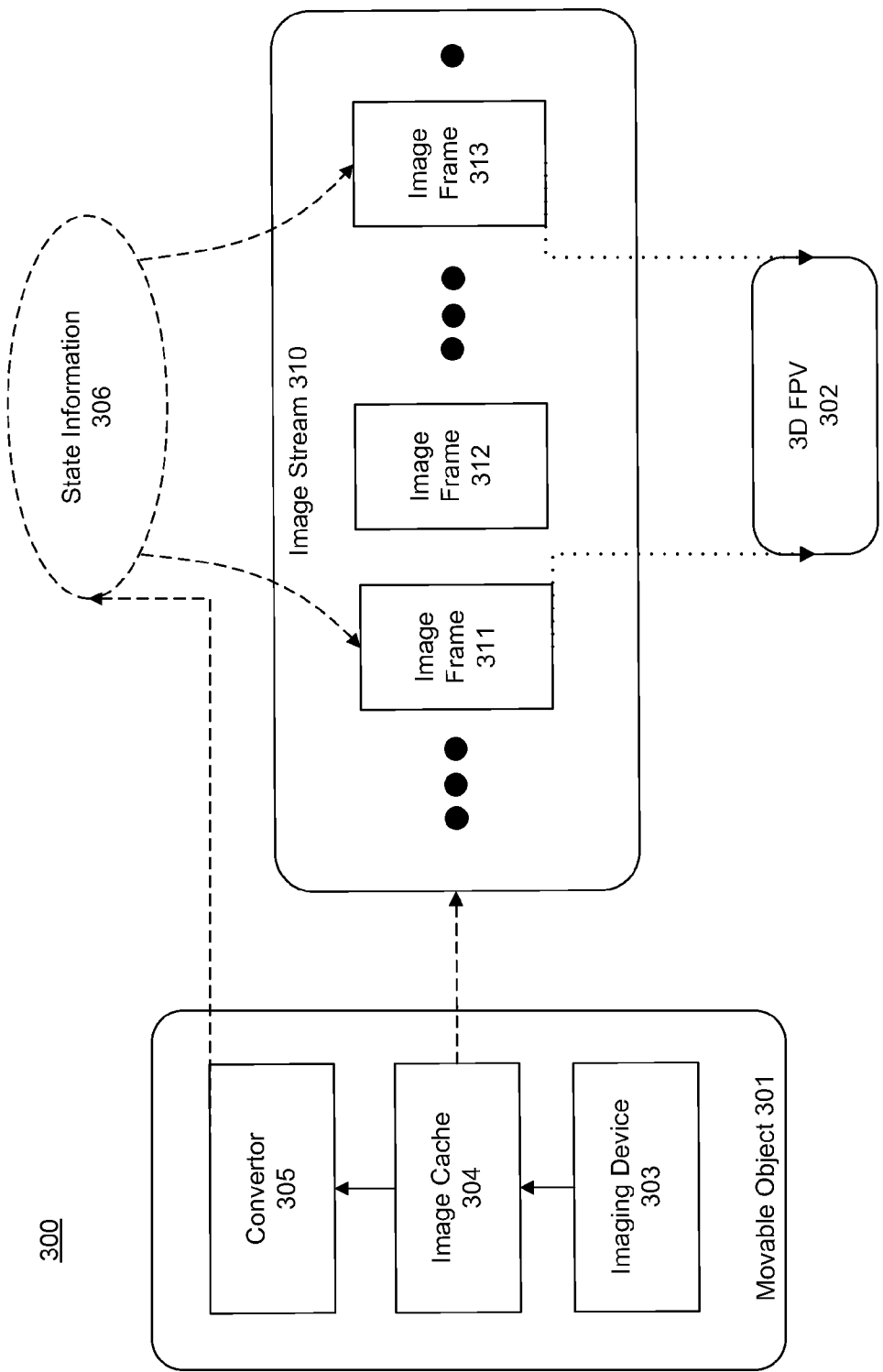
FIG. 3 illustrates supporting three-dimensional display via a movable object in a movable object environment, in accordance with various embodiments of the present invention.

FIG. 3 illustrates supporting three-dimensional (3D) display via a movable object in a movable object environment, in accordance with various embodiments of the present invention. As shown in FIG. 3, an imaging device 303 on a movable object 301 can capture a plurality of image frames, such as the image frames 311-313 in an image stream 310.

Furthermore, the captured image frames can be stored in an image cache 304 for a time period before being purged and/or replaced with other newly captured image frames. For example, the image cache 304, which has a limited size, can be used for (dynamically) maintaining a portion of the stream of image frames 310, which may be in a compressed format. Alternatively, the image cache 304 can be used for (dynamically) maintaining a buffer of frames, which may not be compressed.

In accordance with various embodiments of the present invention, a processor, such as a convertor 305, which may be residing on the movable object 301, can receive the captured image frames 311-313 stored in the image cache 304. Then, the convertor 305 can convert the two-dimensional (2D) information contained in the plurality of image frames into pseudo three-dimensional (3D) information. For example, the pseudo 3D information can be in the form of a pair of image frames.

Furthermore, a three-dimensional (3D) first person view (FPV) equipment 302 can be used for displaying the pseudo three-dimensional information (3D). The 3D FPV equipment 302 can display the pair of image frames on a split 2D screen, with one image displayed on the left portion of the screen and the other image displayed on the right portion of the screen. Additionally, the 3D FPV equipment 302 can use two lenses with identical focus distance, which may be configured to be substantially close or equal to the distance between the lenses and the display screen. Also the field of view (FOV) for each lens may be configured to match only half of the screen. Thus, using the 3D FPV equipment 302, the system can take advantage of the image capturing module, encoding/decoding module, and communication module, which are typically used for handling 2D information.

Additionally, the convertor 305 can obtain state information 306 of the imaging device 303 on the movable object 301, e.g. an attitude, an instantaneous position, a velocity, and an acceleration of the imaging device 303. The state information 306 may be determined based on the positional and attitude information of the movable object, which may be received from a control module for the movable object (e.g. a flight control module of a UAV). Also, the state information 306 may be determined based on the attitude information of the imaging device received from a payload stabilization control module. For example, the payload stabilization control module may be used for controlling a stabilization system such as a gimbal system that stabilizes an imaging device on a UAV.

In accordance with various embodiments of the present invention, the convertor 305 can configure a pair of image frames, based on the image frames 311-313 that are stored in an image cache 304, for supporting three-dimensional (3D) display.

As shown in FIG. 3, an image frame 313, which is selected from the image frames that are maintained in the image cache 304, may be used as a first image frame in the pair of image frames. For example, the image frame 313 may be the latest image frame in the stream of image frames 310. Then, the convertor 305 may select and/or generate a second image frame from the stream of image frames, which may be displayed along with the first image frame to create a three-dimensional effect.

Then, the convertor 305 can provide the pair of image frames 311 and 313 to a displaying device 302 that is adapted to display a three-dimensional FPV. Additionally, the system can configure a size for the image cache 304 on the movable object 301 based on an estimated frame count difference between a first image frame and a second image frame in the pair of image frames for creating a three-dimensional (3D) effect.

Figure 4:
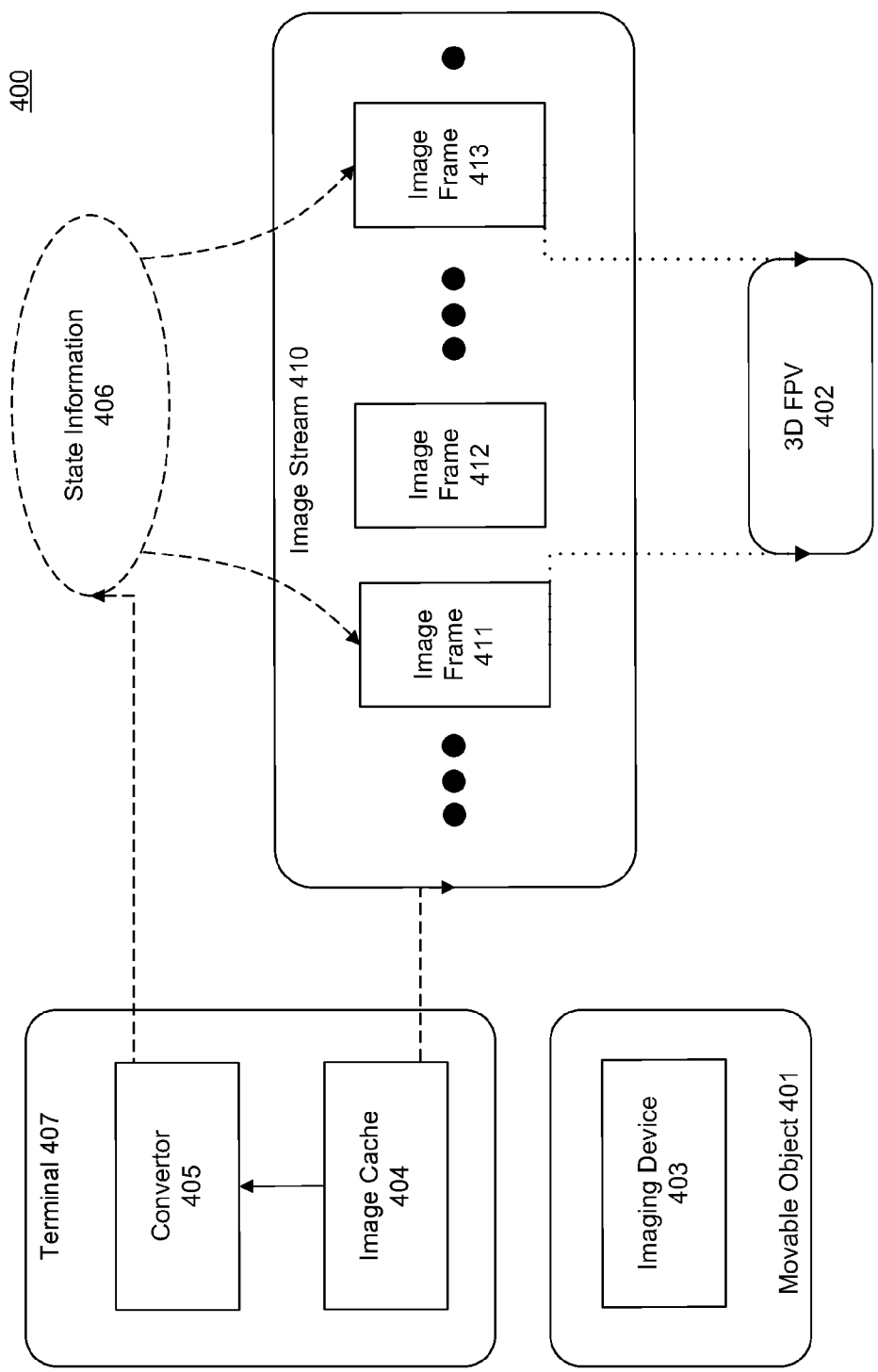
FIG. 4 illustrates supporting three-dimensional display via a terminal in a movable object environment, in accordance with various embodiments of the present invention.

FIG. 4 illustrates supporting three-dimensional (3D) display via a terminal in a movable object environment, in accordance with various embodiments of the present invention. As shown in FIG. 4, an imaging device 403 on a movable object 401 can capture a plurality of image frames, such as the image frames 411-413 in an image stream 410. Then, the movable object can transmit the captured image frames to a terminal 407, which is remote from the movable object 401

Furthermore, the captured image frames can be stored in an image cache 404 for a time period before being purged and/or replaced with other newly captured image frames. For example, the image cache 404, which has a limited size, can be used for (dynamically) maintaining a portion of the stream of image frames 410, which may be in a compressed format. Alternatively, the image cache 304 can be used for (dynamically) maintaining a buffer of frames, which may not be compressed.

In accordance with various embodiments of the present invention, a processor, such as a convertor 405 on the terminal 407 can receive the captured image frames 411-413, which are stored in an image cache 404. Then, the convertor 405 can convert the two-dimensional (2D) information contained in the captured image frames into pseudo three-dimensional information (3D). For example, the pseudo 3D information may be in the form of a pair of image frames.

Furthermore, a three-dimensional (3D) first person view (FPV) equipment 402 can be used for displaying the pseudo three-dimensional information (3D). The 3D FPV equipment 402 can display the pair of image frames on a split 2D screen, with one image displayed on the left portion of the screen and the other image displayed on the right portion of the screen. Additionally, the 3D FPV equipment 402 can use two lenses with identical focus distance, which may be configured to be the distance between the lenses and the display screen. Also the field of view (FOV) for each lens may be configured to match only half of the screen. Thus, using the 3D FPV equipment 402, the system can take advantage of the image capturing module, encoding/decoding module, and communication module, which are typically used for handling 2D information.

Additionally, the convertor 405 can obtain state information 406 of the imaging device 403 on the movable object 401, e.g. an attitude, an instantaneous position, a velocity, and an acceleration of the imaging device 403. The state information 406 may be determined based on the positional and attitude information of the movable object, which may be received from a control module for the movable object (e.g. a flight control module of a UAV). Also, the state information 406 may be determined based on the attitude information of the imaging device received from a payload stabilization control module. For example, the payload stabilization control module may be used for controlling a stabilization system such as a gimbal system that stabilizes an imaging device on a UAV.

In accordance with various embodiments of the present invention, the convertor 405 can configure a pair of image frames, based on the image frames 411-413 that are stored in an image cache 404, for supporting three-dimensional (3D) display.

As shown in FIG. 4, an image frame 413, which is selected from the image frames that are maintained in the image cache 404, may be used as a first image frame in the pair of image frames. For example, the image frame 413 may be the latest image frame in the stream of image frames 410. Then, the convertor 405 may select and/or generate a second image frame from the stream of image frames, which may be displayed with the first image frame to create a three-dimensional effect.

For example, the converter 405 can select an image frame 411 as the second image frame in the pair of image frames for creating three-dimensional (3D) effect. Then, the convertor 405 can provide the pair of image frames 411 and 413 to a displaying device 402 that is adapted to display a three-dimensional FPV.

Additionally, the system can configure a size for the image cache 404 on the terminal 407 based on various factors, such as an estimated frame count difference between a first image frame and a second image frame in the pair of image frames for creating a three-dimensional effect.

Figure 5:
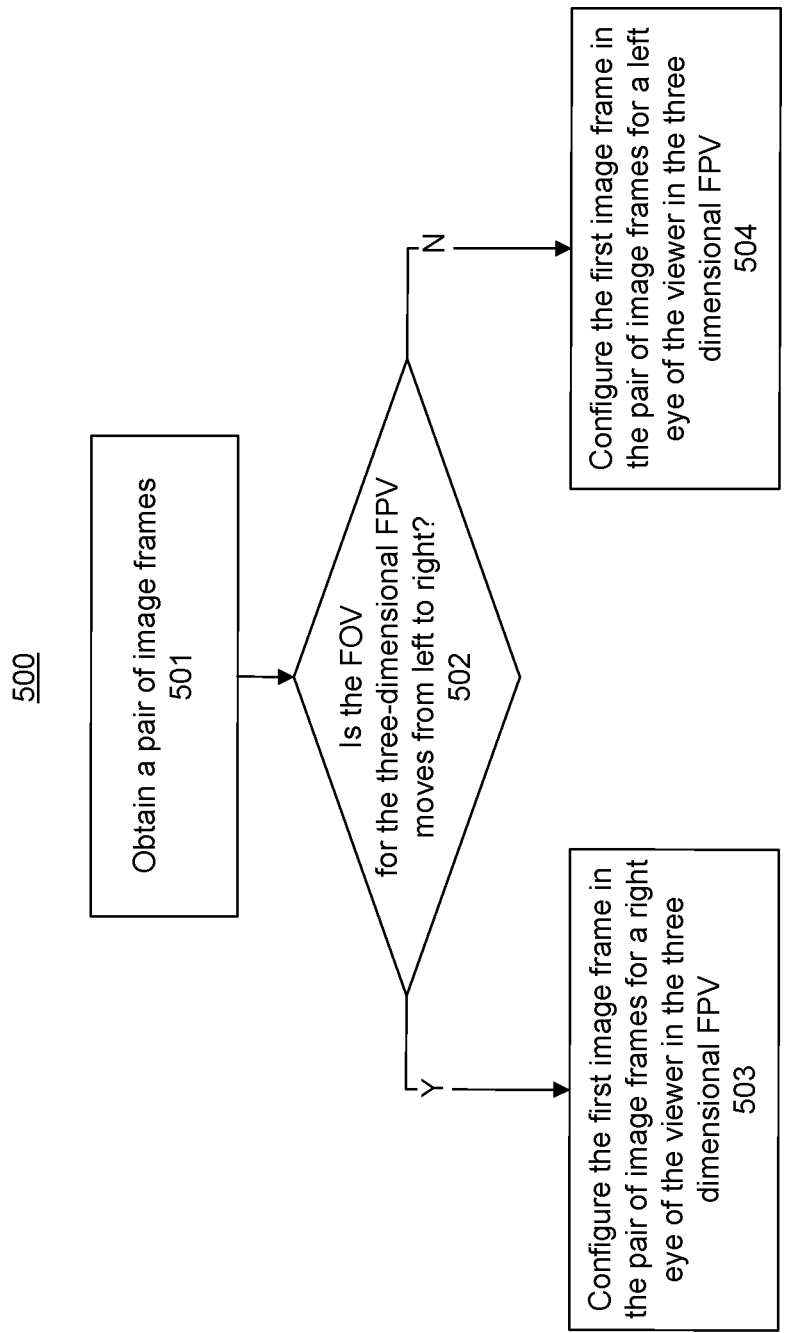
FIG. 5 illustrates supporting three-dimensional first person view (FPV) in a movable object environment, in accordance with various embodiments of the present invention.

FIG. 5 illustrates supporting three-dimensional first person view (FPV) in a movable object environment, in accordance with various embodiments of the present invention. As shown in FIG. 5, at step 501, the system can obtain a pair of image frames that are suitable for three-dimensional (3D) display.

Then, the system can determine a movement of a field of view (FOV) for the three-dimensional FPV, based on the state information of the imaging device on the movable object. For example, at step 502, the system can determine whether the FOV for the three-dimensional FPV moves from left to right.

At step 503, if the FOV for the three-dimensional (3D) FPV moves from left to right, the system can configure the first image frame in the pair of image frames for a right eye of a viewer in the three dimensional FPV. Or, at step 504, the system can configure the first image frame in the pair of image frames for a left eye of a viewer in the three dimensional FPV, if the FOV for the three-dimensional (3D) FPV moves from right to left.

Figure 6:
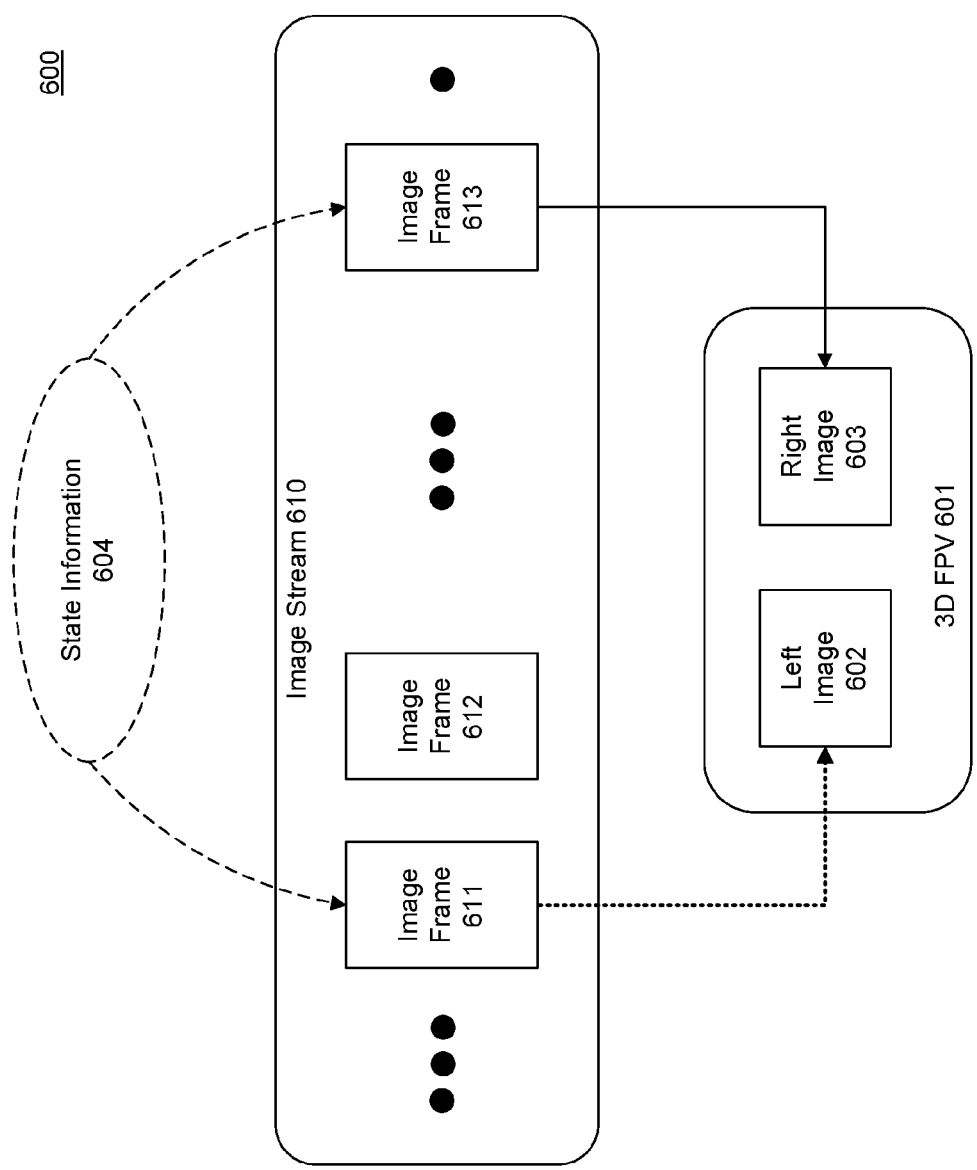
FIG. 6 illustrates supporting three-dimensional (3D) first person view (FPV) with the field of view (FOV) moving from left to right in a movable object environment, in accordance with various embodiments of the present invention.

FIG. 6 illustrates supporting three-dimensional (3D) first person view (FPV) in a movable object environment with the field of view (FOV) moving from left to right, in accordance with various embodiments of the present invention. As shown in FIG. 6, a movable object environment 600 includes a three-dimensional (3D) first person view (FPV) 601, which displays a left image 602 and a right image 603 to create three-dimensional (3D) effect by taking consideration of state information of the imaging device on a movable object that captures the image frames 611-613.

When the FOV of the 3D FPV 601 moves from left to right, the system can select an image frame from the stream of image frames 610 as a right image in the pair of image frames. For example, the system can select the latest image frame 613 as the right image in the pair of image frames. Alternatively, the system can select the latest image frame 613 for configuring (e.g. modifying/editing/rescaling) the right image in the pair of image frames. Then, the system can configure the left image in the pair of image frames based on another image stored in an image cache.

In accordance with various embodiments of the present invention, the system can configure the left image in the 3D FPV 601 using different strategies. For example, the system can select another image frame 611 in the stream of image frames 610 as the left image in the pair of image frames, e.g. based on a predetermined frame count difference relative to the image frame 613 in the stream of image frames 610. Alternatively, the system can construct or reconstruct the left image 602 based on the image frame 611 in the stream of image frames 610.

In accordance with various embodiments of the present invention, the system can dynamically reconfigure the frame count difference between the first image frame and the second image frame in the pair of image frames based on the state information 604 of the imaging device on the movable object. For example, the system can configure a smaller frame count difference when the imaging device (i.e. the movable object) moves at a higher speed, and configure a larger frame count difference when the imaging device (i.e. the movable object) moves at a lower speed.

Alternatively, the system allows a user to configure the frame count difference between the first image frame and the second image frame in the pair of image frames, while viewing the three-dimensional FPV in order to achieve the best user experience.

In accordance with various embodiments of the present invention, the system can provide different viewing experience by using configurable frame count difference between the first image frame and the second image frame in the pair of image frames that are used by the 3D FPV 601 for creating 3D effect.

For example, the greater the frame count difference is, the greater the parallax distance (i.e. the disparity) for the nearby objects can be, and the closer the human eyes may perceive the nearby objects to be (to the extent that 3D effect may still be created). On the other hand, the perceived distance for a remote object may hardly change as the frame count difference changes. That is because, the remote objects are perceived to be at an infinite distance. Thus, the depth change for a remote object, as it is perceived by the human eyes, is small when the frame difference increases.

Conversely, when the frame count difference decreases, the nearby objects may be perceived by the human eyes to be moving farther away. For similar reason as above, the perceived distance for a remote object may hardly change as the frame count difference decreases.

Figure 7:
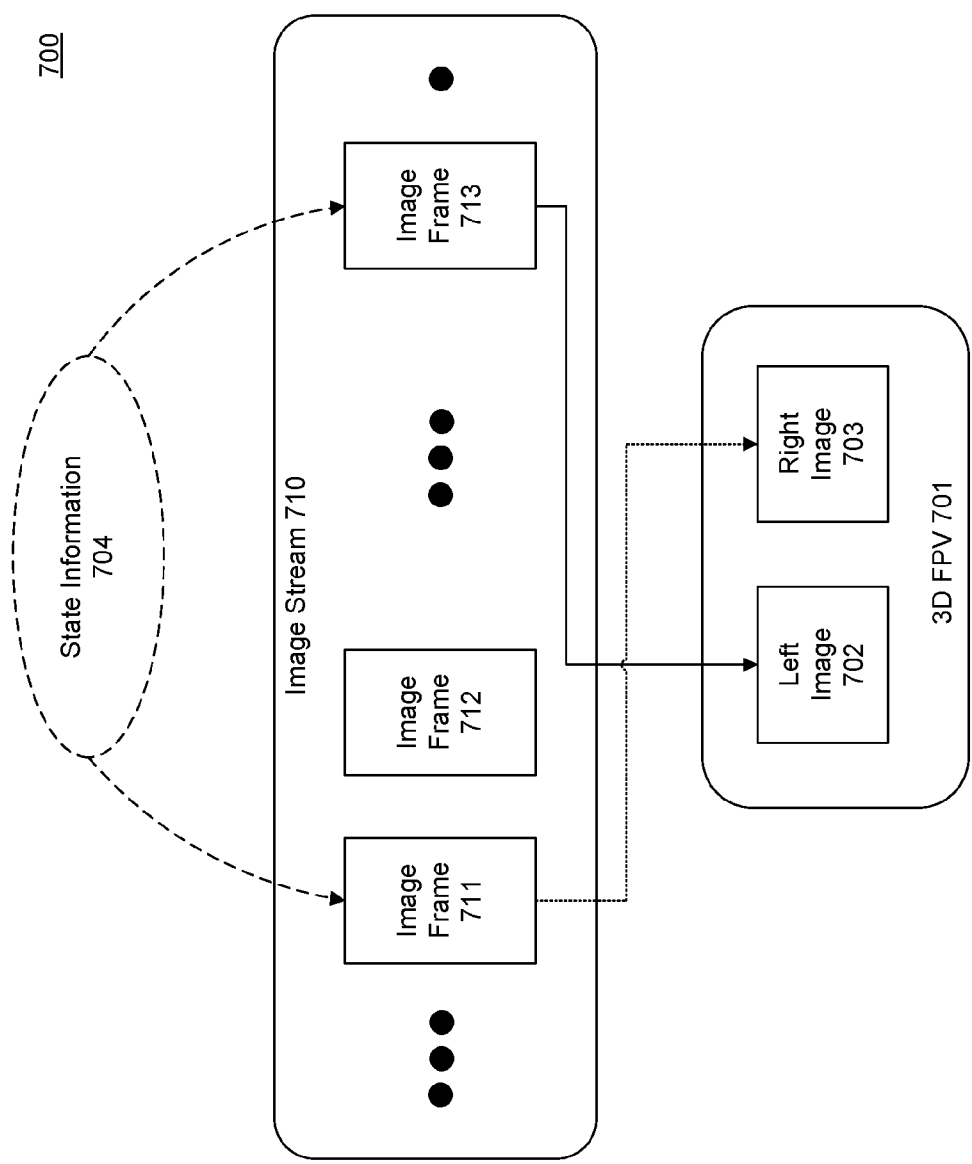
FIG. 7 illustrates supporting three-dimensional (3D) first person view (FPV) with the field of view (FOV) moving from right to left in a movable object environment, in accordance with various embodiments of the present invention.

FIG. 7 illustrates supporting three-dimensional (3D) first person view (FPV) with the field of view (FOV) moving from right to left in a movable object environment, in accordance with various embodiments of the present invention. As shown in FIG. 7, a movable object environment 700 includes a three-dimensional (3D) first person view (FPV) 701, which displays a left image 702 and a right image 703 to create three-dimensional (3D) effect by taking consideration of state information of the imaging device on a movable object that captures the image frames 711-713.

When the FOV of the 3D FPV 701 moves from right to left, the system can select an image frame from the stream of image frames 710 as a left image in the pair of image frames. For example, the system can select the latest image frame 713 as the left image in the pair of image frames. Alternatively, the system can select the latest image frame 713 for configuring (e.g. modifying/editing/rescaling) the left image in the pair of image frames. Then, the system can configure the right image in the pair of image frames based on another image stored in an image cache.

In accordance with various embodiments of the present invention, the system can configure the right image in the 3D FPV 701 using different strategies. For example, the system can select another image frame 711 in the stream of image frames 710 as the right image in the pair of image frames, e.g. based on a predetermined frame count difference relative to the image frame 713 in the stream of image frames 710. Alternatively, the system can construct or reconstruct the right image 702 based on the image frame 711 in the stream of image frames 710.

In accordance with various embodiments of the present invention, the system can dynamically reconfigure the frame count difference between the first image frame and the second image frame in the pair of image frames based on the state information 704 of the imaging device on the movable object. For example, the system can configure a smaller frame count difference when the imaging device (i.e. the movable object) moves at a higher speed, and configure a larger frame count difference when the imaging device (i.e. the movable object) moves at a lower speed.

Alternatively, the system allows a user to configure the frame count difference between the first image frame and the second image frame in the pair of image frames, while viewing the three-dimensional FPV in order to achieve the best user experience.

Figure 8:
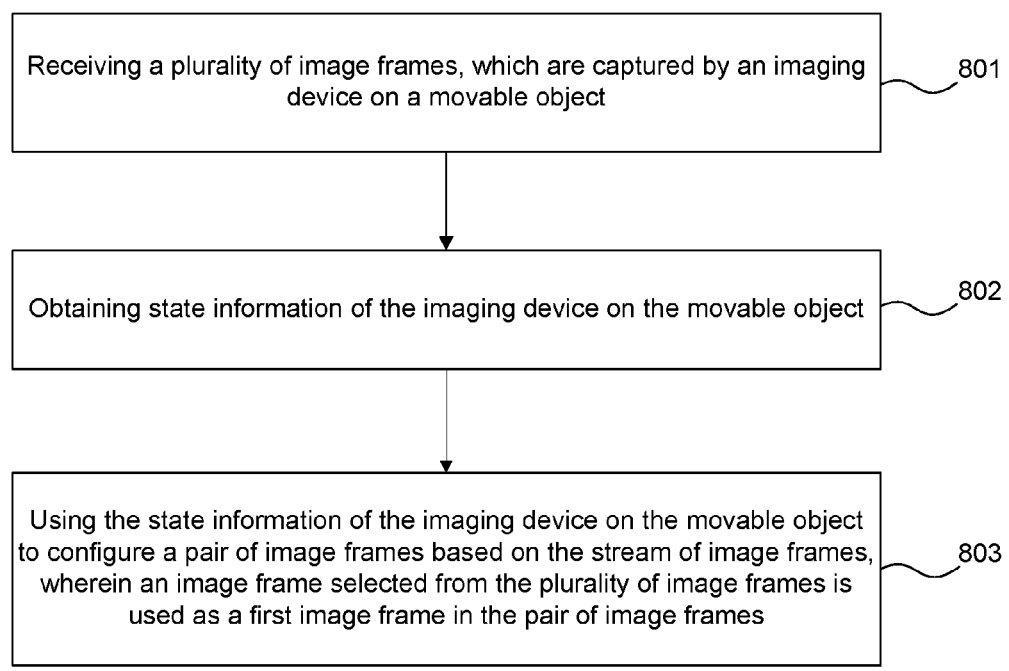
FIG. 8 shows a flowchart of supporting three-dimensional display in a movable object environment, in accordance with various embodiments of the present invention.

FIG. 8 shows a flowchart of supporting three-dimensional display in a movable object environment, in accordance with various embodiments of the present invention. As shown in FIG. 8, at step 801, the system can receive a plurality of image frames, which are captured by an imaging device on a movable object. Then, at step 802, the system can obtain state information of the imaging device on the movable object. Furthermore, at step 803, the system can use the state information of the imaging device on the movable object to configure a pair of image frames based on the plurality of image frames, wherein an image frame selected from the plurality of image frames can be used as a first image frame in the pair of image frames.

Figure 9:
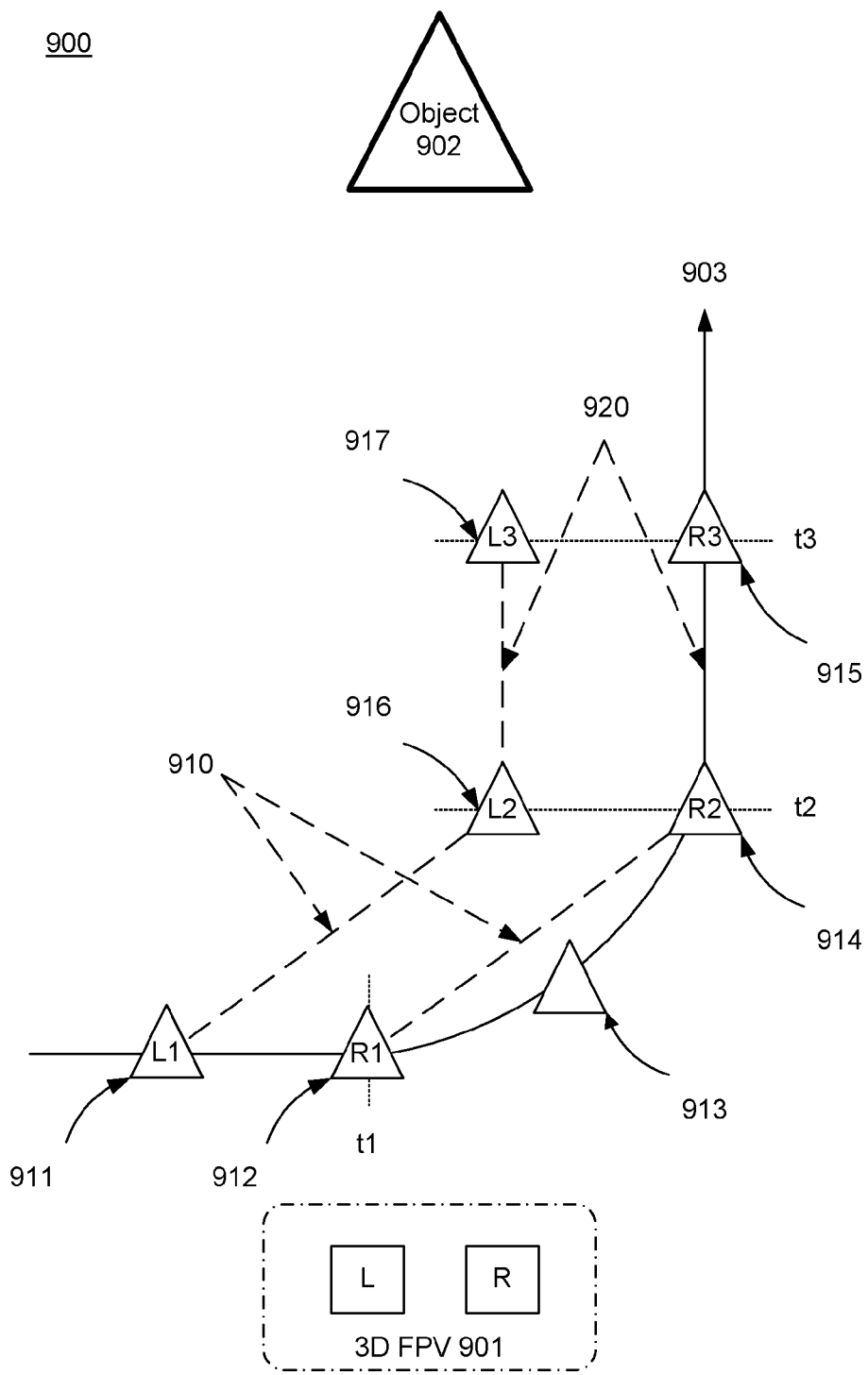
FIG. 9 illustrates supporting three-dimensional first person view (FPV) for different states in a movable object environment, in accordance with various embodiments of the present invention.

FIG. 9 illustrates supporting three-dimensional first person view (FPV) for different states in a movable object environment, in accordance with various embodiments of the present invention. As shown in FIG. 9, an imaging device on a movable object can capture a plurality of image frames (e.g. for an object 902), which includes the image frames 911-915, along a trace 910 in a movable object environment 900.

In accordance with various embodiments of the present invention, the convertor can obtain the state information of the imaging device on the movable object. For example, the state information includes positional information, such as the location, speed, and acceleration of the movable object based on the information received from a control module for the movable object. Additionally, the convertor can obtain the attitude information for the imaging device based on the attitude information received from both the control module for the movable object and the payload control module. Thus, the system can obtain the actual location and attitude of the imaging device by combining the positional information received from the control module for the movable object and the attitude information received from the payload control module.

In the example as shown in FIG. 9, without limitation, the FOV of the 3D FPV 901 may move from left to right along a line facing the object 902 (e.g. at the time point, t1). Then, the FOV of the 3D FPV 901 moves toward the object 902 (e.g. at the time point, t2 and t3).

The image frame 912, which is captured at the time point, t1, may be selected as the right image (i.e. R1) for the 3D FPV 901.

Then, the system can look back into the captured image frames to select the image frame 911 as the left image (i.e. L1) in order to support the 3D FPV 901. The selection of the left image (i.e. L1) may be based on a frame count difference, which can be preconfigured based on the state information of the imaging device. For example, the system can configure a smaller frame count difference when the imaging device (i.e. the movable object) moves at a higher speed, and can configure a larger frame count difference when the imaging device (i.e. the movable object) moves at a lower speed.

Thus, the image frame 911 and the image frame 913 can be provided to the 3D FPV for creating a three-dimensional (3D) effect. Also, the initial pair of image frames 911 and 913, or any subsequent image frame pairs, can be used as a base for determining a pair of image frames for a new time point.

For example, at the time point t2, the system can select an image frame 914 as the right image (i.e. R2) for the 3D FPV display 901. Since the movable object and the imaging device moves toward the object 902 at the time point t2, in order to create a three-dimensional (3D) effect for the 3D FPV display 901. Instead of directly selecting an image from the captured image frames as the left image, the system can construct or reconstruct an image 916 (i.e. L2), based on the base image 911 in the captured image frames.

As shown in FIG. 9, the system may need to construct the second image (i.e. L2), which is an image that is (virtually) positioned on a line also facing the object 902 (i.e. parallel to the line along the pair of image frames L1 and R1).

The system can obtain a transformation relationship 910 between the image R2, which is the first image in the pair of image frames, and the image R1, which is the first image in a base pair of image frames. For example, the transformation relationship 910 can be based on a homography that is obtained based on matching feature points between the image frame R1 912 and the image frame R2 914.

In accordance with various embodiments of the present invention, the feature point based image matching may involve different steps such as feature point detecting, feature point characterization, and feature point matching. At the feature point detecting step, the system can detect the feature points and their coordinates. Then, at the feature point characterization step, the system can calculate the feature vectors, each of which represents the image information in a neighborhood surrounding a feature point.

Furthermore, after matching the feature point set, the system can obtain the transformation relationship 910. For example, when the object 920 locates at a substantially far away from the imaging device, each pair of matching feature points (e.g. U1 and U2) on the image frame R1 and R2 may satisfy a consistent relationship, U2=H*U1. Thus, the system can estimate the matrix, H, based on the set of matched feature points instead of from the whole set of image points, which is costly.

As shown in FIG. 9, the matrix, H, which includes attitude transformation information and internal parameter information, are the same for both transforming between the left images L1 and L2 and transforming between the right images R1 and R2. Thus, the system can configure the left image, L2, in the pair of image frames based on the transformation matrix, H, and the image L1, which is the left image in the base pair of image frames.

Furthermore, the system can obtain another pair of image frames, R3 915 and L3 917, for the time point t3, based on the pair of image frames, R2 914 and L2 916, and the transformation relationship 920.

Figure 10:
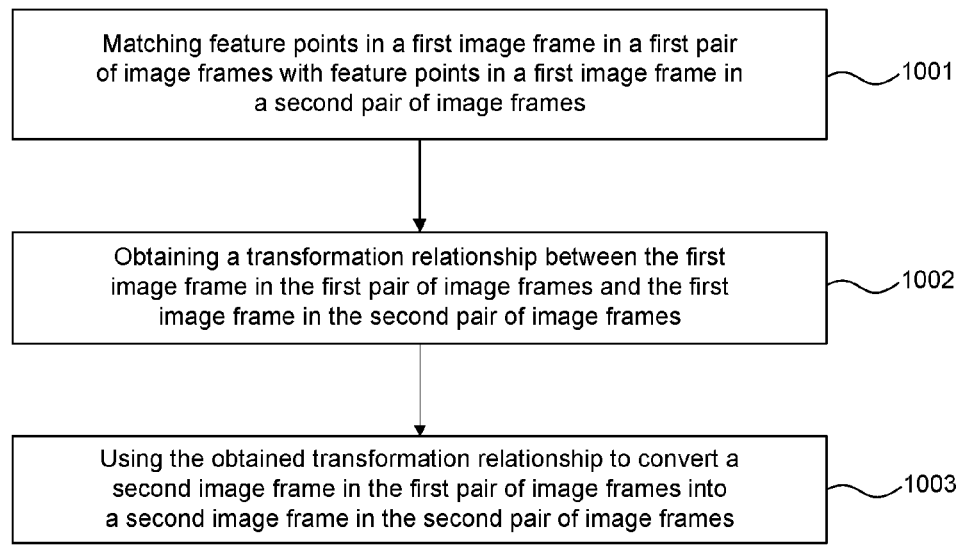
FIG. 10 shows a flowchart of supporting three-dimensional first person view (FPV) for different states in a movable object environment, in accordance with various embodiments of the present invention.

FIG. 10 shows a flowchart of supporting three-dimensional first person view (FPV) for different states in a movable object environment, in accordance with various embodiments of the present invention. As shown in FIG. 10, at step 1001, the system can match feature points in a first image frame in a first pair of image frames with feature points in a first image frame in a second pair of image frames. Then, at step 1002, the system can obtain a transformation relationship between the first image frame in the first pair of image frames and the first image frame in the second pair of image frames. Furthermore, at step 1003, the system can use the obtained transformation relationship to convert a second image frame in the first pair of image frames into a second image frame in the second pair of image frames.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting three-dimensional (3D) display, comprising:
   receiving a plurality of image frames, which are captured by an imaging device on a movable object;
   obtaining state information of the imaging device on the movable object;
   configuring a pair of image frames based on the plurality of image frames using the state information of the imaging device on the movable object, wherein configuring the pair of image frames includes:
      selecting an image frame from the plurality of image frames as a first image frame in a pair of image frames;
      obtaining a transformation relationship between the first image frame in the pair of image frames and a first image frame in a base pair of image frames, wherein the first image frame in the pair of image frames was captured by the imaging device at a different time than either the first image frame or a second image frame in the base pair of image frames, wherein the transformation relationship includes transforming the first image frame in the base pair of image frames into the first image frame in the pair of image frames; and
      generating a second image frame in the pair of image frames by transforming the second image frame in the base pair of image frames using the transformation relationship.

2. The method of claim 1, wherein:
   obtaining state information includes determining state information based on positional and attitude information of the movable object received from a control module for the movable object, and attitude information of the imaging device received from a payload stabilization control module, wherein the payload stabilization control module controls a stabilization system, which stabilizes the imaging device on the movable object.

3. The method of claim 1, further comprising:
   providing the pair of image frames to a displaying device that is adapted to display a three-dimensional (3D) first person view (FPV).

4. The method of claim 1, wherein:
   the first image frame in the pair of image frames is a latest image frame in a stream of image frames.

5. The method of claim 1, further comprising:
   determining a movement of a field of view (FOV) for a three-dimensional (3D) first person view (FPV), based on state information of the imaging device on the movable object.

6. The method of claim 5, further comprising:
   configuring the first image frame in the pair of image frames for a right image in the three-dimensional (3D) FPV, if the FOV for the three-dimensional FPV moves from left to right, and
   configuring the first image frame in the pair of image frames for a left image in the three-dimensional (3D) FPV, if the FOV for the three-dimensional FPV moves from right to left.

7. The method of claim 1, further comprising:
   selecting another image frame in the plurality of image frames as a second image frame in the pair of image frames based on a frame count difference.

8. The method of claim 7, further comprising:
   dynamically reconfiguring the frame count difference between the first image frame and the second image frame in the pair of image frames based on the state information of the imaging device on the movable object.

9. The method of claim 7, further comprising:
   allowing a user to configure the frame count difference between the first image frame and the second image frame in the pair of image frames, while viewing a three-dimensional (3D) first person view (FPV).

10. The method of claim 1, wherein:
    the transformation relationship is a homography that is obtained based on matching feature points between the first image frame in the pair of image frames and the first image frame in the base pair of image frames.

11. The method of claim 1, further comprising:
    obtaining another pair of image frames based on the plurality of image frames, wherein an image frame selected from the plurality of image frames is used as a first image frame in said another pair of image frames and a second image frame in said another pair of image frames is obtained based on the second image frame in the pair of image frames and another transformation relationship.

12. The method of claim 1, further comprising:
    determining a second image frame in the pair of image frames based on an image stored in an image cache, wherein the image cache operates to store a portion of a stream of image frames and/or a buffer of image frames.

13. The method of claim 1, further comprising:
    configuring a size for an image cache based on an estimated frame count difference between the first image frame and a second image frame in the pair of image frames.

14. A system for supporting three-dimensional (3D) display, comprising:
    one or more microprocessors;
    a convertor running on the one or more microprocessors, wherein the convertor operates to:
       receive a plurality of image frames, which are captured by an imaging device on a movable object;
       obtain state information of the imaging device on the movable object; and
       configure a pair of image frames based on the plurality of image frames using the state information of the imaging device on the movable object, wherein configuring the pair of image frames includes:
          selecting an image frame from the plurality of image frames as a first image frame in a pair of image frames;
          obtaining a transformation relationship between the first image frame in the pair of image frames and a first image frame in a base pair of image frames, wherein the first image frame in the pair of image frames was captured by the imaging device at a different time than either the first image frame or a second image frame in the base pair of image frames, wherein the transformation relationship includes transforming the first image frame in the base pair of image frames into the first image frame in the pair of image frames; and
          generating a second image frame in the pair of image frames by transforming the second image frame in the base pair of image frames using the transformation relationship.

15. The system of claim 14, wherein:
    the state information is determined based on positional and attitude information of the movable object received from a control module for the movable object, and attitude information of the imaging device received from a payload stabilization control module, wherein the payload stabilization control module controls a stabilization system, which stabilizes the imaging device on the movable object.

16. The system of claim 14, wherein:
the convertor operates to provide the pair of image frames to a displaying device that is adapted to display a three-dimensional (3D) first person view (FPV).

17. The system of claim 14, wherein:
the first image frame in the pair of image frames is a latest image frame in the plurality of image frames.

18. The system of claim 14, wherein:
the convertor operates to determine a movement of a field of view (FOV) for a three-dimensional first person view (FPV), based on state information of the imaging device on the movable object.

19. The system of claim 14, wherein:
the convertor operates to
configure the first image frame in the pair of image frames for a right image in a three-dimensional (3D) first person view (FPV), if the FOV for the three-dimensional FPV moves from left to right, and
configure the first image frame in the pair of image frames for a left image in the three-dimensional (3D) FPV, if the FOV for the three-dimensional FPV moves from right to left.

20. The system of claim 14, wherein:
the convertor operates to select another image frame in the plurality of image frames as a second image frame in the pair of image frames.

21. The system of claim 20, wherein:
the convertor operates to dynamically reconfigure a frame count difference between the first image frame and the second image frame in the pair of image frames based on the state information of the imaging device on the movable object.

22. The system of claim 20, wherein:
a user is allowed to configure the frame count difference between the first image frame and the second image frame in the pair of image frames, while viewing a three-dimensional (3D) first person view (FPV).

23. The system of claim 14, wherein:
the transformation relationship is a homography that is obtained based on matching feature points between the first image frame in the pair of image frames and the first image frame in the base pair of image frames.

24. The system of claim 14, wherein:
the convertor operates to obtain another pair of image frames based on the plurality of image frames, wherein an image frame selected from the plurality of image frames is used as a first image frame in said another pair of image frames and a second image frame in said another pair of image frames is obtained based on the second image frame in the pair of image frames and another transformation relationship.

25. The system of claim 14, wherein:
the convertor operates to determine a second image frame in the pair of image frames based on an image stored in an image cache, wherein the image cache operates to store a portion of a stream of image frames and/or a buffer of image frames.

26. The system of claim 14, wherein:
the convertor operates to configure a size for an image cache based on an estimated frame count difference between a first image frame and a second image frame in the pair of image frames.

27. A non-transitory computer-readable medium with instructions stored thereon, that when executed by a processor, perform the steps comprising:
receiving a plurality of image frames, which are captured by an imaging device on a movable object;
obtaining state information of the imaging device on the movable object;
configuring a pair of image frames based on the plurality of image frames using the state information of the imaging device on the movable object, wherein configuring the pair of image frames includes:
selecting an image frame from the plurality of image frames as a first image frame in a pair of image frames;
obtaining a transformation relationship between the first image frame in the pair of image frames and a first image frame in a base pair of image frames, wherein the first image frame in the pair of image frames was captured by the imaging device at a different time than either the first image frame or a second image frame in the base pair of image frames, wherein the transformation relationship includes transforming the first image frame in the base pair of image frames into the first image frame in the pair of image frames; and
generating a second image frame in the pair of image frames by transforming the second image frame in the base pair of image frames using the transformation relationship.

28. A system for supporting first person view (FPV), comprising:
an imaging device on a movable object, wherein the imaging device operates to capture a plurality of image frames; and
a transmitting device on the movable object, wherein the transmitting device operates to provide a pair of image frames to a displaying device that is adapted to display a three-dimensional FPV, wherein:
the pair of image frames are generated based on the plurality of image frames using state information of the imaging device on the movable object;
an image frame from the plurality of image frames is selected as a first image frame in the pair of image frames;
a transformation relationship between the first image frame in the pair of image frames and a first image frame in a base pair of image frames is obtained, the first image frame in the pair of image frames being captured by the imaging device at a different time than either the first image frame or a second image frame in the base pair of image frames, wherein the transformation relationship includes transforming the first image frame in the base pair of image frames into the first image frame in the pair of image frames; and
a second image frame in the pair of image frames is generated by transforming the second image frame in the base pair of image frames using the transformation relationship.

* * * * *